United States Patent [19]

Carlin et al.

[11] Patent Number: 5,694,549
[45] Date of Patent: Dec. 2, 1997

[54] MULTI-PROVIDER ON-LINE COMMUNICATIONS SYSTEM

[75] Inventors: Richard K. Carlin, Houston; Joseph F. Frantz, II, Sugarland, both of Tex.

[73] Assignee: Telescan, Inc., Houston, Tex.

[21] Appl. No.: 205,195

[22] Filed: Mar. 3, 1994

[51] Int. Cl.[6] .................................................. G06F 13/00
[52] U.S. Cl. ........................... 395/200.2; 395/200.18; 395/352
[58] Field of Search ................................. 395/200, 800, 395/600, 200.2, 200.18, 200.09, 200.08, 333, 339, 352

[56] References Cited

U.S. PATENT DOCUMENTS

| | | | |
|---|---|---|---|
| 4,827,508 | 5/1989 | Sheaz | 380/4 |
| 4,992,940 | 2/1991 | Dworkin | 364/401 |
| 5,220,501 | 6/1993 | Lawlor et al. | 364/408 |
| 5,247,575 | 9/1993 | Sprague et al. | 380/9 |
| 5,319,542 | 6/1994 | King et al. | 364/401 |
| 5,327,554 | 7/1994 | Palazzi et al. | 395/524 |
| 5,347,632 | 9/1994 | Filepp et al. | 395/200 |
| 5,379,421 | 1/1995 | Palazzi et al. | 395/600 |
| 5,428,606 | 6/1995 | Moskowitz | 370/60 |

*Primary Examiner*—Mehmet B. Geckil
*Attorney, Agent, or Firm*—Conley, Rose & Tayon, P.C.; Michael F. Heim

[57] ABSTRACT

An on-line communications service allows a plurality of service providers to provide services to respective groups of subscribers, with the on-line service from each provider being independent of the on-line service from other providers. The subscribers' access to features is maintained through service maps which are customized by the service provider interactively with the host computer. Upon log-on, the service map is downloaded to a subscriber's computer and defines the services which can be accessed, the appearance of the user interface and navigation through the services. Data for each provider's service is maintained separately from the data for other providers. Billing can be customized for each provider.

16 Claims, 7 Drawing Sheets

MULTI-PROVIDER ON-LINE COMMUNICATIONS SYSTEM

TECHNICAL FIELD OF THE INVENTION

This invention relates in general to on-line communication systems, and more particularly to an on-line communication system for providing separate private on-line services for multiple service providers through a centralized online system.

BACKGROUND OF THE INVENTION

Since the advent of the personal computer, a number of on-line services have come into being. To use an on-line service, the subscriber establishes a communications link to the provider of the on-line service over a communications line. A communications line is an electronic highway between two computers. The communications line can include, but is not limited to, modem phone line dial-up, X.25 networks, frame relay networks, ATM networks, TCP/IP networks, IPX networks, infrared networks, television cable and wireless cellular systems.

Once the communications link is established, the subscriber can communicate with the host system, which provides the on-line services. The host system can comprise, for example, a mainframe computer, a network of smaller computers, or even a single personal computer.

The range of features provided by existing on-line services is diverse. Large on-line services, such as COMPUSERVE, provide news and weather information, games, electronic mail, forums, chat lines and on-line shopping. Smaller services, such as Dow Jones News Retrieval, may only supply a small subset of those features. Bulletin board systems (BBSs) are designed to provide on-line services to a much smaller number of subscribers. In many cases, the BBSs are focused toward a particular subject matter or to a particular set of people, such as members of a club or employees of a company. For example, a software developer may have a BBS to provide product support for customers. A BBS of this nature will generally have electronic mail and file upload/download capabilities.

In general, a BBS has fewer capabilities and features available to its subscribers relative to larger on-line systems. Because a single BBS is generally designed to service a limited number of subscribers, it is not possible for a single BBS to provide certain features such as stock information, news retrieval or weather reports which may be offered by a larger on-line service. Another problem with BBSs and smaller on-line services is the time and effort needed to maintain the on-line service. While a number of software packages exist for implementing the BBS on a personal computer, the time required to customize the BBS to a certain configuration is significant. Further, a number of hardware or software problems may arise during operation of the BBS which require on-site human intervention to restart the system. Hence, for on-line services systems which must remain operational at all times, full-time human supervision is necessary.

Yet another problem with smaller on-line services is billing. While some services can bill through the telephone company using a 900 service or similar plan, such pricing is inflexible and may discourage membership in the service. Maintaining billing locally is once again time-consuming and costly to the owner of the on-line service.

Therefore, a need has arisen for a on-line service which may be configured to provide dedicated features to a small group of users while having a robust set of features and capabilities and reduced maintenance and billing capabilities for service providers.

SUMMARY OF THE INVENTION

In the present invention, a multi-provider on-line service offers a number of on-line services. The multi-provider on-line system may be uniquely configured by a plurality of service providers, such that each service provider can offer its own subset of features to its subscribers and customize the appearance of the user interface. Each subscriber is associated with a service provider, typically through a subscriber ID. When a subscriber logs on to the on-line system, he or she may access the subset of features determined by the service provider.

The present invention provides significant advantages over the prior art. A company or individual who wishes to provide a private on-line system can customize the multi-provider on-line system to offer the desired features. Subscribers to a particular service have access only to those features chosen by their service provider, and subscribers to other services on the multi-provider on-line service do not have access to the particular service's private data, unless such data has been authorized for public use. Hence, each provider can generate an on-line service which appears to the subscriber to be an independent on-line service. However, because the multi-provider host can economically offer advanced features to the service providers, each service provider can offer features which might otherwise be impractical for a small service provider. Further, the service provider does not need to maintain the equipment for providing the on-line service or concern itself with billing matters.

In one aspect of the present invention, data can be "published" by a service provider, whereby certain databases, which are private to the service provider, can be made accessible to other providers on the multi-provider on-line system for inclusion in the other providers' subset of features. The publishing provider can set a fee for accessing the data.

In a second aspect of the invention, a provider's subset of features may include a menu entry which allows a subscriber to "menu hop" to another service. For example, if a service provider has two separate on-line services on the multi-provider on-line system, it may allow subscribers of one service to switch to the other service, without the need to log off and establish a connection with the other service. When a menu hop is requested, the multi-provider on-line service changes the subset of features to which the subscriber has access from the subset provided by the first service to the subset provided by the second service.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
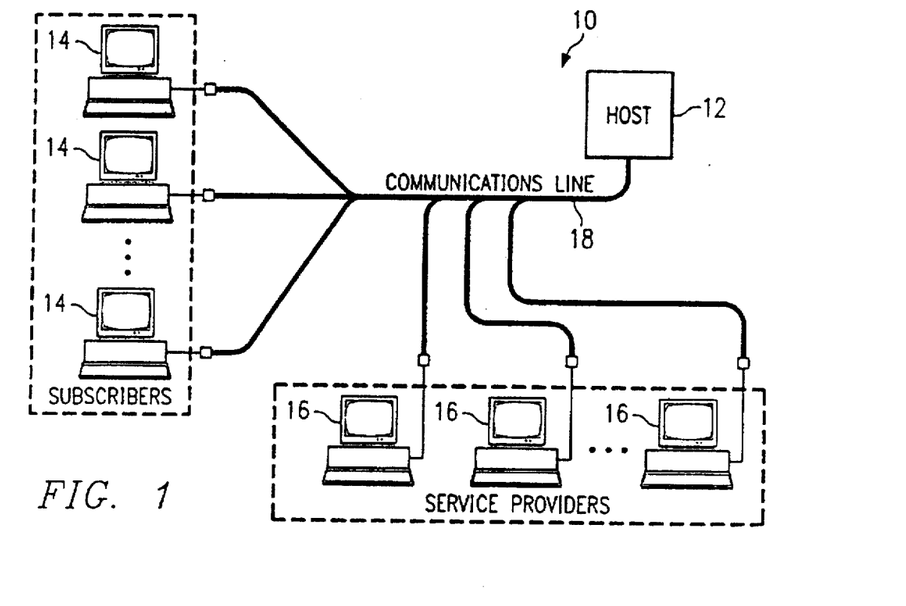
FIG. 1 illustrates a schematic representation of a communication system.

FIG. 1 illustrates a schematic representation of an on-line service using the multi-provider on-line system of the present invention. The multi-provider on-line system, generally referred to by reference numeral 10, is controlled by host computer 12, which is connected to a plurality of terminals. For purposes of illustration, the terminals are denoted in FIG. 1 as subscriber terminals 14 and service provider terminals 16. The terminals 14 and 16 communicate with the host 12 through communications line 18.

In operation, the host computer 12 is operable to provide a plurality of features to the subscriber terminals 14 via the communications line 18. The features which may be provided by the host 12 may vary; typical features which would be provided by the host 12 would include electronic mail, forums, newsletters, roundtables, on-line purchasing, and searchable databases. These features are well known in the art. A more detailed list of features is provided in Table I, hereinbelow. This list is not meant to be comprehensive of the features which may be offered by a particular service in accordance with the invention, but is provided as an example of what may be offered by the host computer 12.

TABLE I

| Example On-Line Features |
|---|
| General |
|    Not Available |
|    Easylink Gateway |
|    Menu |
|    Searchable Database |
|    All Searchable Databases |
|    Text |
|    Text Collection |
|    Multi-media Document |
|    Multi-media Document Collection |
| Billing |
|    Account Info |
|    Bill Summary |
|    Monthly Bill |
|    Monthly Usage |
| Communications |
|    Calendar |
|    Conferencing |
|    Classified |
|    Directory |
|    Electronic Mail |
|    Employment |
|    Forum |
|    Newsletter |
|    Poll |
|    Products |
|    Prof Interest Area |
|    Roundtables |
|    Software |
|    Video Conferencing |
| News Services |
|    Business |
|    Commodity |
|    Feature |
|    World & Natl |
|    Market |
|    Monetary |
|    Sports |
|    Stocks - Comtex |
|    Stocks - Reuters |
| Stock Information |
|    Facts |

TABLE I-continued

| Example On-Line Features |
|---|
|    Insider Trading |
|    Listed Options |
|    Macro*World Reports |
|    Marketguide Reports |
|    Morning Star Reports |
|    Mutual Fund Directory |
|    Quarterly Earnings |
|    S&P Marketscope Reports |
|    Technical Criteria |
|    Valuation Criteria |
|    Zacks Earnings Estimates |
| Market Analysis |
|    Current Quotes |
|    Graphs |
|    Historical Quotes |
|    Prosearch - Mutual Funds |
|    Prosearch - Options |
|    Prosearch - Stocks |
|    Symbol Lookup |
|    Top Picks |
| S&P MarketScope |
|    Action Menu |

In contrast to present-day systems, the multi-provider on-line system allows a plurality of service providers, who would normally require their own on-line equipment and staff to offer a private on-line service, to define a set of features to offer to subscribers. Hence, each service provider can generate a private on-line service to be offered to subscribers using the features offered by the host 12 and, where appropriate, upload data for access solely to its own subscribers. The service provider may then offer the private on-line service to a group of subscribers of its choosing. This group of subscribers can access the features chosen by the service provider and will not have access to other features offered by the host computer 12 which am not chosen by the service provider or to information provided by other service providers.

For example, a first service provider may be offering support for a software package. The software provider could set up a private on-line service which provided for electronic mail, forums in which the subscribers could communicate with the service provider's technical staff and with each other to discuss the application, newsletters to update the subscriber's items of interest relating to the application, a file library from which subscribers can download files relating to the application and an on-line shopping area in which subscribers could order products through the service provider. A second service provider may offer a service to antique car enthusiasts. This service may also provide electronic mail, forums, newsletters, on-line shopping, as described in connection with the first service provider, and further provide a searchable database of articles on antique cars whereby the subscribers to the second service can search the articles for research purposes. While both the software support service and the antique car club service are provided from the host computer 12, the two services do not interact. Subscribers to the first service cannot access the electronic mail, forum messages, newsletters, on-line shopping areas, or searchable database of the second service. Likewise, subscribers to the second service cannot access the electronic mail, forum messages, newsletters, file library or on-line shopping areas of the first service. In other words, while both services offer some of the same features (electronic mail, forums, newsletters, and on-line shopping), the data related to these services is kept separate so that subscribers of one service cannot access data from another service. Consequently, each subscriber sees the on-line service to which he or she subscribes as an independent service provided by the service provider.

Although each subscriber sees the associated on-line service as independent, the central administration of the multiple private on-line services offers economy of scale and ease of administration. For example, a small online service may not be able to afford a sophisticated search engine for searching large textual databases. However, the host 12, which may be servicing a large number of small, private on-line services can offer a sophisticated on-line search engine, which may be used by each service provider in conjunction with their textual databases. Hence, each service provider can offer enhanced features on a small scale while maintaining control over access of its data.

Another advantage of the system shown in FIG. 1 is that the host computer 12 is maintained by the multi-provider on-line service. Hence, the service provider does not need to provide maintenance personnel to oversee the operation of the on-line service. A third advantage of the multi-provider on-line service is that all billing to the subscribers may be centrally administered through the multi-provider on-line system 10, rather than by the individual service providers. Hence, the service providers receive the difference between the revenues from the subscribers less the cost of supplying the services through the host 12. Consequently, the service providers may offer a sophisticated online service with very few responsibilities other than uploading specific data to be used in connection with their private on-line service.

The host computer 12, shown in FIG. 1, may take a variety of forms. In the preferred embodiment, the host 12 is a network of mini- or micro-computers which are networked together. This host structure allows the capacity of the host to be increased as demand increases. In other embodiments, a larger computer, such as a mainframe computer, or a plurality of mid-size or mainframe computers, may be used. The terminals 14 and 16 can comprise, for example, personal computers. It should be noted, however, that the terminals 14 and 16 may comprise other processing systems, such as interactive television devices or any other device capable of connecting to a central processing system over a communications line.

Figure 2:
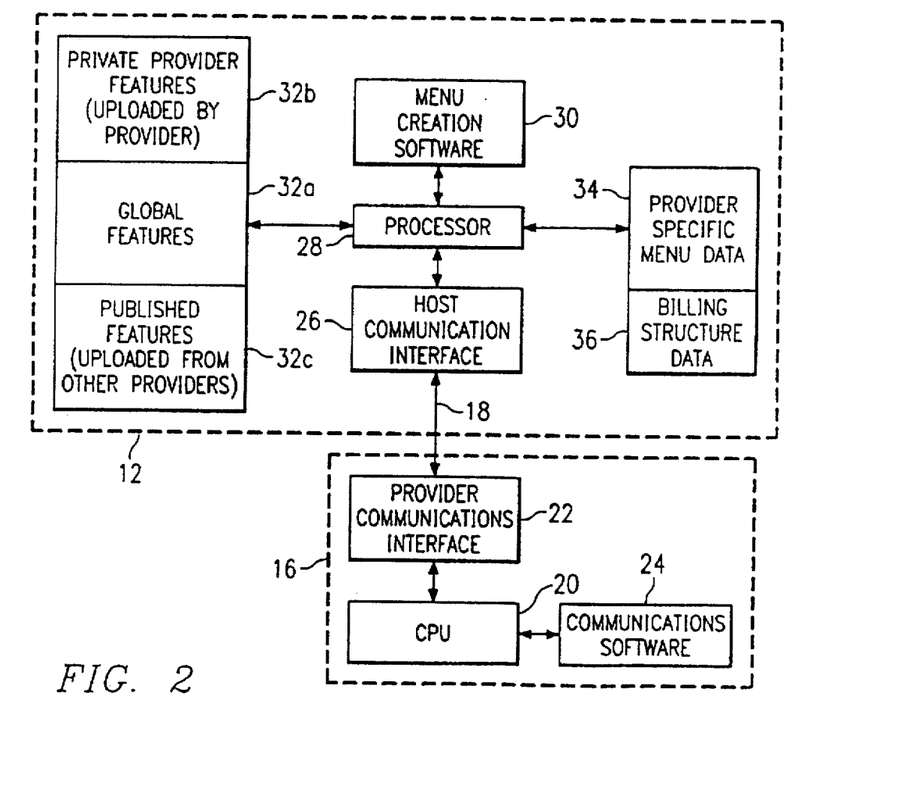
FIG. 2 illustrates a functional block diagram of the communication system with respect to generation of a private on-line service by a service provider.

FIG. 2 illustrates a functional block diagram illustrating the operation of the host 12 and a service provider terminal 16 in connection with definition of a private on-line service. The service provider terminal 16 includes a central processing unit (CPU) 20 coupled to a communications interface 22 and communication software 24. Communications interface 22 is typically a modem or other device for coupling the provider terminal 16 to the communications line 18. The communication software controls operation of the CPU and communications interface such that data can be sent to, and received from, the host 12 over communications 18. The host 12 sends and receives data to and from the service provider terminal 16 through host communication 26, which is coupled to processor 28. Under control of menu creation software 30, the processor interacts with the service provider to define a set of features to which the service provider's subscribers will have access. There are three main categories of features from which the service provider may choose. The first category includes the global features 32a, which are features supplied by the owner of the host and are accessible to all service providers. The second category includes private provider features 32b, which are features supplied by the provider creating the menu. These features must be uploaded (or otherwise supplied) by the provider, and are not accessible by any other provider. An example of this type of feature is a searchable database, such as the antique car database described above, uploaded by a service provider. The third class of features includes published features 32c. These are features uploaded from another provider who has designated these features as "published." A published feature may be accessed by any provider to include in its definition of features. The "publisher" of the features dictates the fee for access of the published service by subscribers of other providers.

An exemplary method of defining the features to be provided is shown in FIGS. 3a–j. The set of features for a particular service provider is referred to as a "map." The map associates the features with the subscriber interface. Once the map is defined, data for the map is stored in the provider specific menu data 34. Further, the provider can specify the desired billing structure for its subscribers (i.e., flat-rate, hourly rate, and so on). The billing specified by the provider determines how much its subscribers will be charged for accessing the private on-line service. The billing structure data is stored in block 36. The owner of the multi-provider on-line service subtracts its fees from the revenues received from the subscribers and pays the difference to the provider.

Figure 3A:
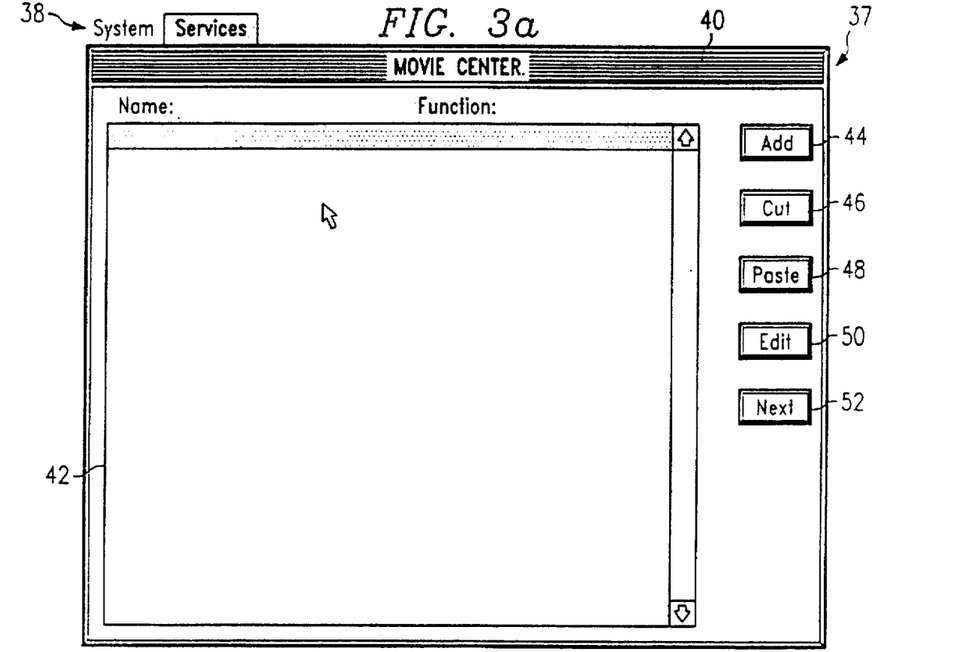
FIGS. 3a–j illustrate the generation a private on-line service by a service provider.
Figure 3B:
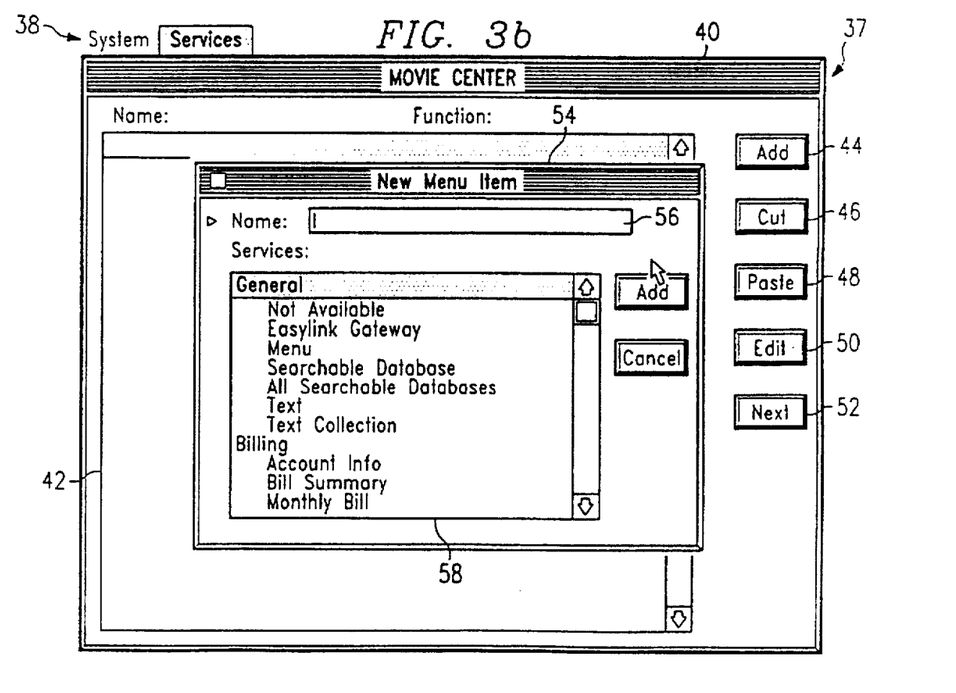

FIGS. 3a–i illustrate an exemplary method of the creation of map information along with a menu defining the features to be provided to the subscribers. FIG. 3a illustrates an initial screen 37 for defining the menu. The screen includes a menu bar 38, a title bar 40 with the name of the service, a window 42, an ADD button 44, a CUT button 46, a PASTE button 48, an EDIT button 50 and a NEXT button 52. To create a new service, "create map" (not shown) is chosen from the "services" menu on the menu bar 38 to define the features to be used in the service along with a user interface.

Figure 3C:
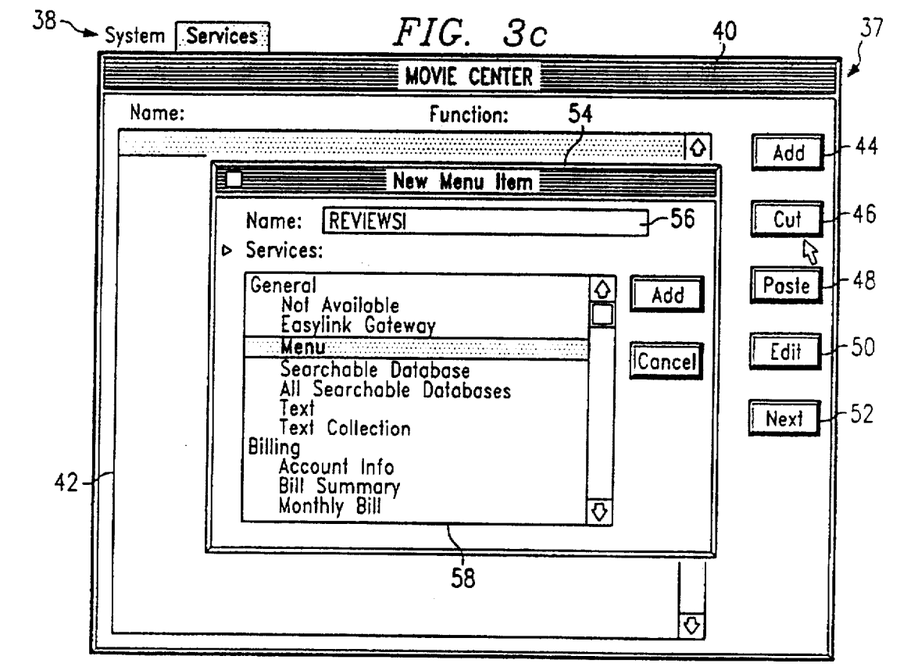
Figure 3D:
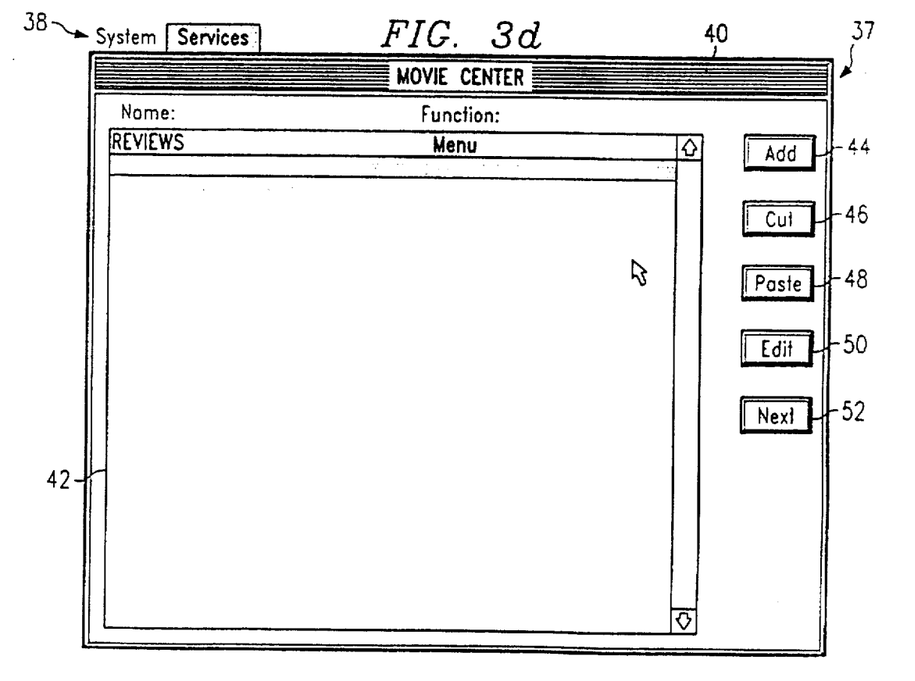

By pressing the ADD button 44, a dialog box 54 is displayed (shown in FIG. 3b), with a field 56 for the provider to enter the name of the menu item and a list of available features in window 58. By entering a name and selecting a feature, the menu item is generated. In FIG. 3c, a "REVIEWS" menu item is created. "REVIEWS" will be a top-level menu item; i.e., REVIEWS will be displayed on the menu bar of the subscriber's user interface (see FIG. 3j). By pressing ADD, the dialog box 54 is removed and the data is entered into window 42, showing the name and function of the menu item (see FIG. 3d).

Figure 3E:
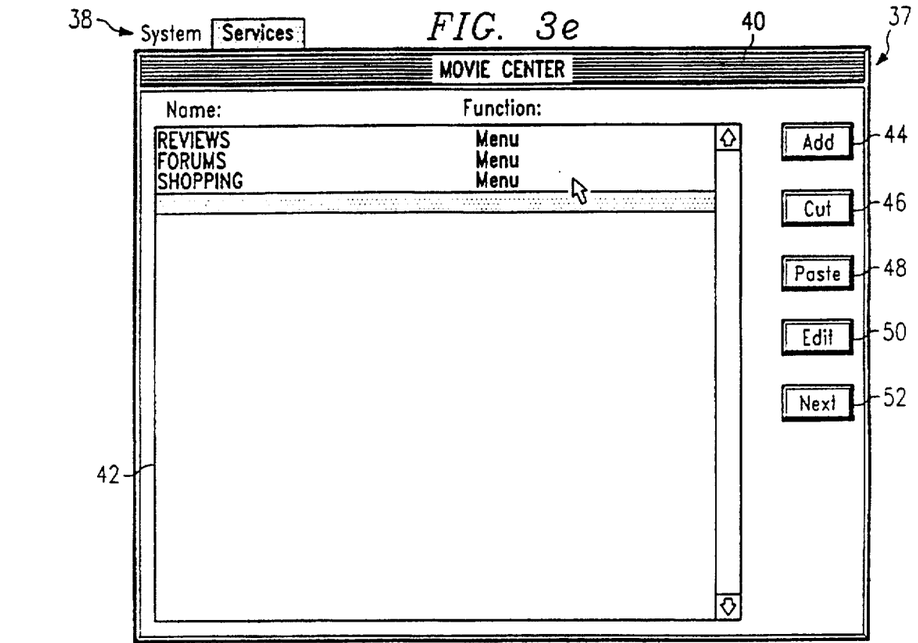

In FIG. 3e, the screen 37 is shown after three top-level menu items have been entered using the method shown in connection with FIGS. 3a–d.

Figure 3F:
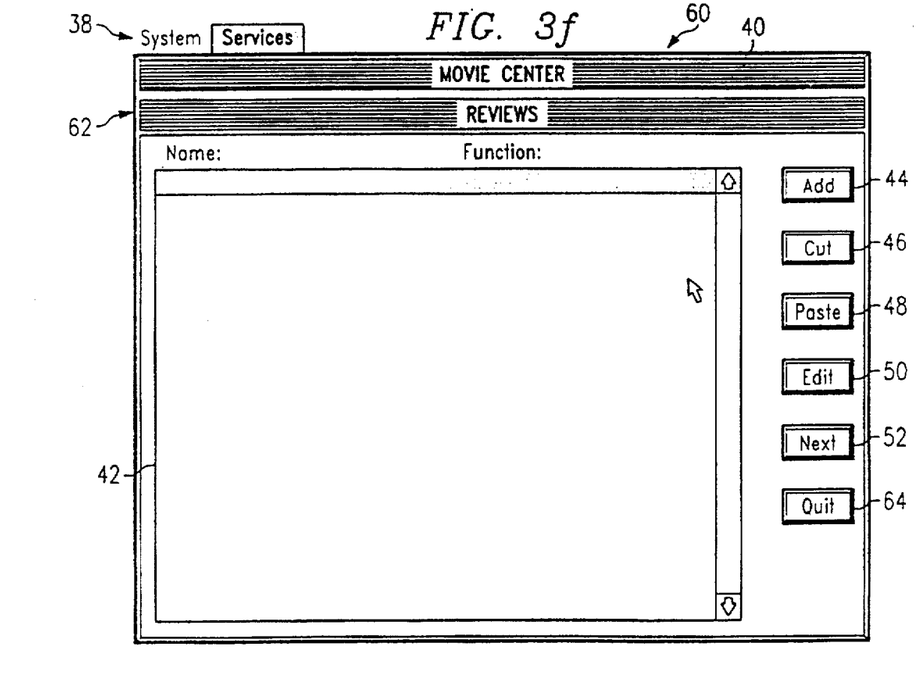
Figure 3G:
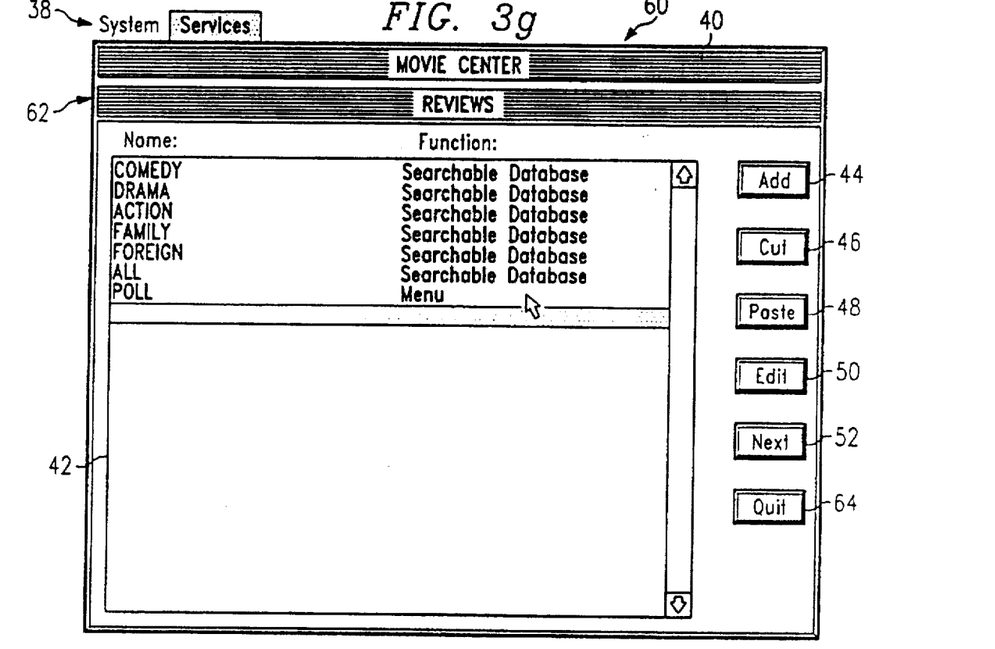
Figure 3H:
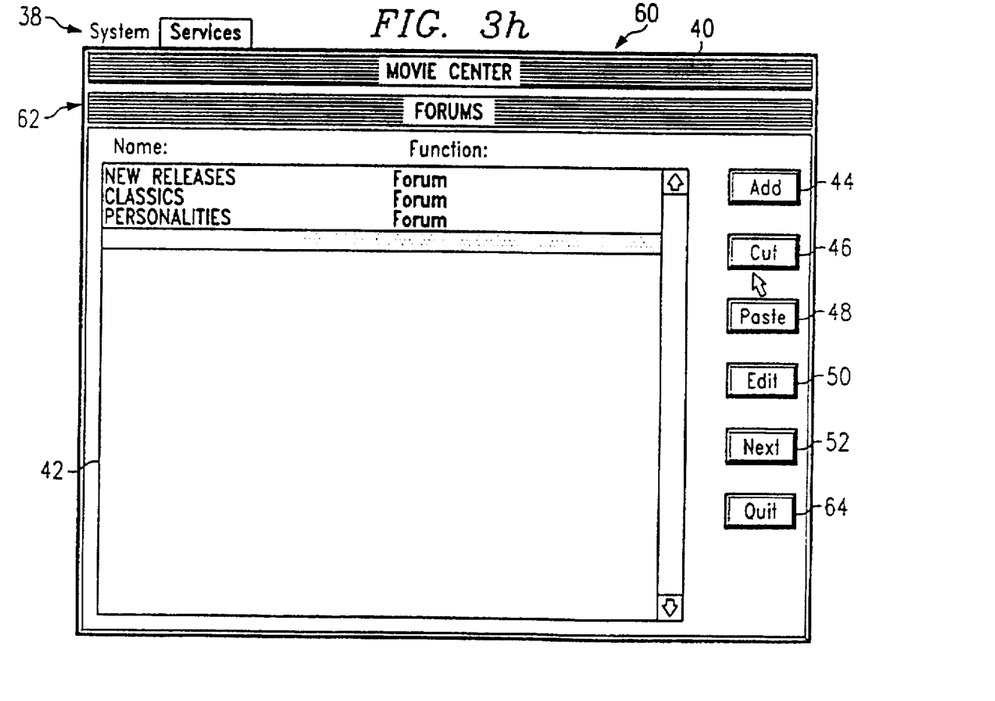
Figure 3I:
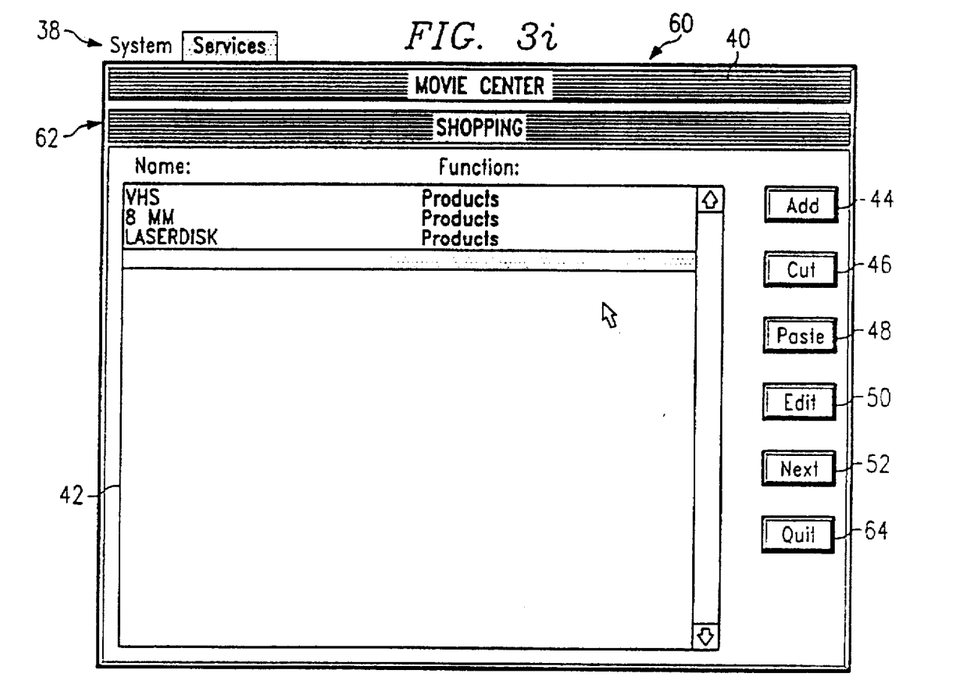

By highlighting a menu item (REVIEWS, FORUMS or SHOPPING) in window 42 and pressing the NEXT button 52, a lower-level menu structure may be generated. As shown in FIG. 3f, a second input screen 60, having a second level title bar 62, is displayed which is otherwise the same as input screen 37 of FIG. 3a. Using the method described in connection with FIGS 3a–d, the subheadings for the REVIEWS menu item are entered. As shown in FIG. 3g, the REVIEWS menu item has seven subitems, including six searchable databases (COMEDY, DRAMA, ACTION, FAMILY, FOREIGN and ALL) and a second level menu item entitled POLL. Additional menu topics for the POLL menu item could be generated by highlighting POLL and pressing the NEXT button 52. When the selections for the REVIEWS menu item have been entered, the QUIT button 64 is pressed, which returns the provider to the screen shown in FIG. 3e. FIGS. 3h and 3i illustrate the second level menu screens for the "Forums" and "Shopping" first level menu items, respectively.

Figure 3J:
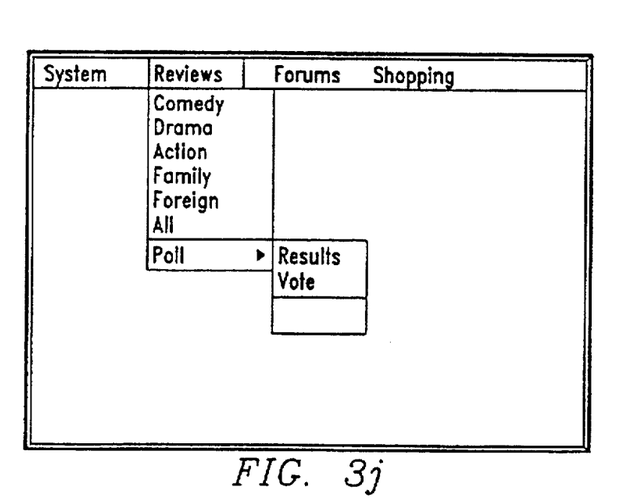

FIG. 3j illustrates a resultant menu which would be displayed at the subscriber's terminal for the service defined in connection with FIGS. 3a–i. As shown, the first level menu, "REVIEWS," has been selected and second level menu item, POLL, has been selected from the menu list under "REVIEWS", showing third level menu features, "Results" and "Vote." Navigating pull-down menus of this type is well known in the art.

While a particular user interface is shown in FIG. 3i, it should be noted that other interface styles and features could be provided. For example, in addition to, or in place of, the menu bar generated in FIGS. 3a–i, additional interface objects, such as buttons, icons, drop-down boxes can be used to implement the interface.

When the provider has finished defining its private on-line service, the host generates a service map which defines the set of features available in the service and the menu to be used by the provider's subscribers. The service map is stored in the host 12 in the provider specific map data memory 34. The service map may comprise, for example, a linked list of menu codes which define the menu structure. The menu codes are associated with features to be provided by the host.

Figure 4:
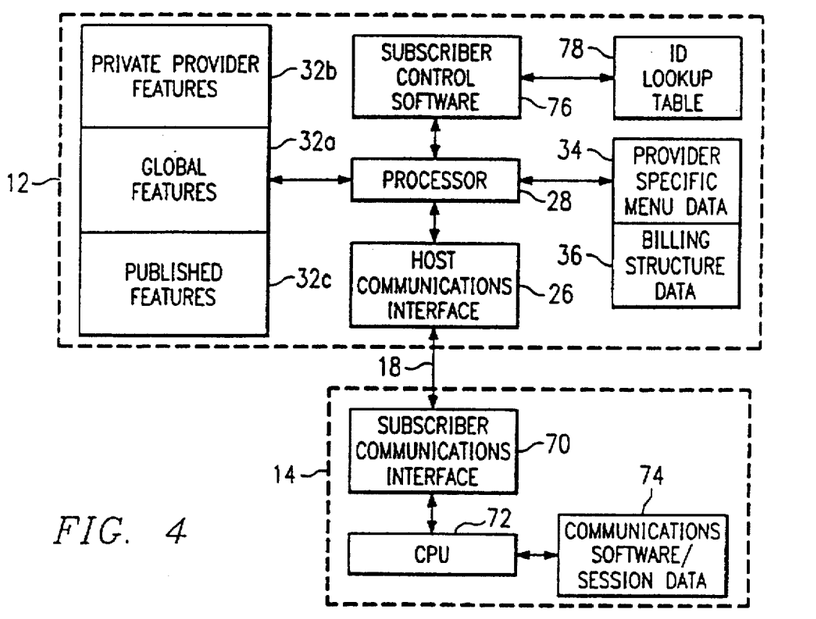
FIG. 4 illustrates a functional block diagram illustrating operation of the communication system with respect to a subscriber.

FIG. 4 illustrates a functional block diagram relating to a subscriber session with the host 12. The subscriber terminal includes a communications interface 70 to couple the terminal to communications line 18. The communications interface is coupled to CPU 72 and communications software/session data 74. The communications software/session data 74 is supplied to the subscriber from the provider and includes the software for communicating with the host 12 along with personal data for the subscriber. Typically, each subscriber is assigned a subscriber IB and password. The subscriber ID is used by the host 12 to determine which provider's service the subscriber is associated with.

The host computer 12 processes data from the subscriber terminal under control of subscriber control software 76 in conjunction with ID look-up table 78, provider specific map data 34 and billing structure data 36. Operation of the host 12, in connection with a subscriber's session, is best understood in connection with the flow chart of FIG. 5. In block 80, the subscriber establishes a communications link with the host 12 through communications interfaces 70 and 26. Once the communications link is established in block 80, the subscriber ID is uploaded from the subscriber terminal to the host 12 in block 84. In block 86, the subscriber ID is used by the host 12 to determine which provider service is associated with the particular subscriber. Typically, this is determined through use of a look-up table 78. When the subscribers associated service is determined, the service map for that service is accessed from the provider's specific map data 34 and that menu information is downloaded to the session data of the subscriber terminal 14 (block 88). The menu data, which is downloaded to the subscriber terminal, defines the actions from which the subscriber can select. Each menu item is coded such that a selection by the subscriber (through interaction with the menu or other user interface controls), in decision block 90, causes the menu code to be sent to the host 12. The subscriber control software 76, in conjunction with the map/menu data information in provider specific map data 34, interprets the code and processes the requested action in block 94.

In the preferred embodiment, the host interactively controls the transfer of menu information to the subscriber terminals 14, such that only the requested menu information is stored in the host at any one time. For example, in the interface illustrated in FIG. 3j, the subscriber would initially be provided with the information for the top level menu, i.e., SYSTEM, REVIEWS, FORUMS, SHOPPING. When a selection was made, that information would be sent to the host 12, which would decode the selection in accordance with the information stored in the provider specific map data 34. If the user selected REVIEWS, for example, a code specifying "menu 2, level 0" (or similar code) would be uploaded to the host 12. This information, along with information identifying the service, would result in transfer of the submenu items for the REVIEWS menu from the host 12 to the subscriber terminal 14. A selection of ACTION from the submenu items would result in transfer of the code "menu 2, level 3" to the host. The host, using map information for the provider would identify the selected action as the searchable database for action films. This embodiment provides a significant advantage; the map may be changed on the fly by the service provider, with the changes being available to the subscriber immediately.

An alternative embodiment would transfer all map or menu information to the subscriber terminal upon initiation of a session. This would provide somewhat faster operation, but would not be as flexible.

As discussed above, a service provider may allow for "menu hopping", i.e., allowing the subscriber to jump from one service to another. If the menu code corresponds to a menu hop, the subscriber control software 76 causes the service map for the new service to be downloaded to the subscriber terminal 14. Once the new service menu is downloaded, the subscriber is confined to the set of features in the new service.

Figure 5:
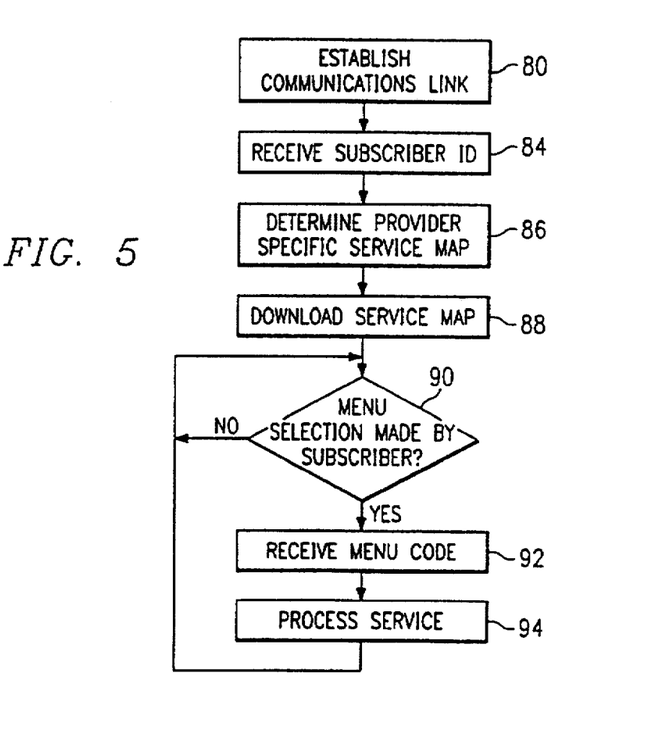
FIG. 5 illustrates a flow chart describing operation of the on-line service during a communication session with a subscriber.

FIG. 5 illustrates the preferred method of restricting access to host features through a service map and menu data which is downloaded to the subscriber's terminal and is used by the communications software on the subscriber terminal to restrict the subscriber to specific features defined by the service provider. Alternatively, the interface could be wholly controlled by the host, rather than by the subscriber terminal, responsive to the service map.

As can be seen from FIGS. 4–5, from the subscriber's standpoint, it appears that he is connected to a on-line service which is administered by the service provider. Since all electronic mail, forums, roundtables, newsletters and similar features are restricted to the subscribers of the particular private on-line service, the on-line service can be used in situations where privacy is important.

The multi-provider on-line service described herein has significant advantages over the prior art. Cost to service providers, and hence, subscribers, are reduced because of the central administration of the equipment and services for a multitude of distinct service providers. Because the number of subscribers of the overall multi-provider on-line service can be much greater than the number of subscribers to any one private on-line service, enhanced features can be provided for access by all service providers which may be prohibitive for any one service provider to supply. Further, the complexity and cost of billing are centralized such that the service providers need only be concerned with the billing structure, and not the day-to-day accounts management. In some cases, a service provider may enhance revenue by publishing services which may be used by other service providers.

It should be noted that the preferred embodiment described herein differs greatly from prior art services such as PRODIGY or COMPUSERVE which allow gateways to other services. In a gateway, the subscriber is transferred to another service on another host, as opposed to the present invention, where the host maintains multiple services.

Although the Detailed Description of the invention has been directed to certain exemplary embodiments, various modifications of these embodiments, as well as alternative embodiments, will be suggested to those skilled in the art. For example, the creation of service maps by the service providers could be performed off-line (after downloading the available features from the host) and then uploaded by the user. Further, the look and complexity of the menus could be varied as desired.

The invention encompasses any modifications or alternative embodiments that fall within the scope of the claims.

What is claimed is:

1. A method of remotely providing an on-line service on a host computer between a plurality of service-providers and a plurality of subscribers, comprising the steps of:

generating service maps for individual service providers, each service map capable of being remotely edited or updated by said individual service-provider, and wherein each of said service maps defines a set of features accessible to an associated subscriber group;

establishing a communications link between a host computer and a subscriber terminal;

associating the subscriber terminal with a service map of a particular service provider; and allowing the subscriber to access the set of features defined by the service provider in its associated service map.

2. The method of claim 1, wherein said associating step comprises the step of receiving a subscriber identity code from the subscriber terminal and determining the associated service map responsive to the subscriber identity code.

3. The method of claim 1, further comprising the step of transmitting a menu for the associated service map from the host computer to the subscriber terminal.

4. The method of claim 3 wherein said allowing step comprises the step of generating a user interface responsive to said menu to display accessible features on said subscriber terminal responsive to the associated service map.

5. The method of claim 4 wherein said allowing step further comprises transmitting selection code information from the subscriber terminal to the host computer corresponding to a menu selection made by the subscriber.

6. The method of claim 5 wherein said step of generating service maps comprises the step of selecting features by a service provider from a list of available features provided by the host computer.

7. The method of claim 1, further comprising the step of transferring data from a first service provider to the host for storage by the host, and wherein the stored data is made available to subscribers associated with said first service provider.

8. The method of claim 7 further comprising the step of publishing a portion of the data to permit other service providers to access the data.

9. The method of claim 7, further comprising the step of transmitting a portion of said data from the host computer to the subscriber terminal based upon the suscriber selections on the associated service map.

10. A multi-provider on-line system comprising:

a host computer system for providing a plurality of on-line features;

a plurality of subscriber terminals;

a communications link between the host computer and said subscriber terminals;

a processor in said host system for orchestrating the transfer of data between the host computer system and the subscriber terminals;

an ID look-up table and subscriber control software for associating a subscriber terminal with a remotely defined provider service map establishing a predetermined set of said on-line features;

provider specific menu data maintained in said host computer system for providing on-line features to the subscriber terminal based upon subscriber selections from the associated service map.

11. The on-line service of claim 10 and further comprising system features and menu creation software for allowing providers to define unique service maps.

12. The on-line service of claim 11 wherein said host computer system includes a list of global features which can be included in the service map of any service provider.

13. The on-line service of claim 12 wherein said host computer further includes a list of private features owned by a service provider, which may be included only in the service map of the owning provider.

14. The on-line service of claim 13 wherein said host computer further includes a list of private features owned by a service provider which are published by the owning provider, and which are made accessible to other service providers.

15. The on-line service of claim 10 wherein said provider specific menu data stores data associated with the service map, and said processor transfers service menu information from said provider specific menu data to an associated subscriber terminal which generates a user menu interface on said subscriber terminal, such that only the features associated with the service map are accessible.

16. The on-line service of claim 15 further comprising billing structure data defined by the service provider for generating bills to associated subscribers.

* * * * *

UNITED STATES PATENT AND TRADEMARK OFFICE
CERTIFICATE OF CORRECTION

PATENT NO.  : 5,694,549
DATED       : December 2, 1997
INVENTOR(S) : Richard K. CARLIN and Joseph F. FRANTZ, II It is certified that error appears in the above-identified patent and that said Letters Patent is hereby corrected as shown below:

In the Title: change "Multi-Provider On-Line Communications System" to --An Interactive System For Remotely And Uniquely Creating, Editing And Administrating An Online Communication System For A Plurality Of Online Service Providers--;

Column 1, Line 1 change "Multi-Provider On-Line Communications System" to --An Interactive System For Remotely And Uniquely Creating, Editing And Administrating An Online Communication System For A Plurality Of Online Service Providers--;

Column 2, Line 63 after "generation" insert --of--;

Column 4, Line 36 change "am" to --are--;

Column 10, Line 1 after "claim 7" insert --,--;

Column 10, Line 9 after "system for" insert --remotely--;

Column 10, Line 23 after "menu data" insert --remotely--;

Column 10, Line 29 after "providers to" insert --remotely--;

Column 10, Line 37 after "claim 12" insert --,--; and

UNITED STATES PATENT AND TRADEMARK OFFICE
CERTIFICATE OF CORRECTION

PATENT NO. : 5,694,549
DATED : December 2, 1997
INVENTOR(S) : Richard K. CARLIN and Joseph F. FRANTZ, II

It is certified that error appears in the above-identified patent and that said Letters Patent is hereby corrected as shown below:

Column 10, Line 50 after "claim 14" insert --,--.

Signed and Sealed this

First Day of May, 2001

Attest:

NICHOLAS P. GODICI

Attesting Officer   Acting Director of the United States Patent and Trademark Office